Figure 9:
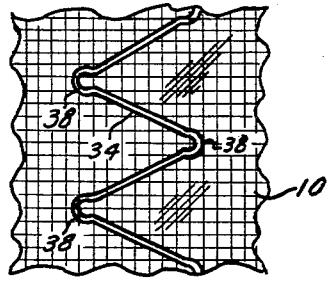

June 14, 1960   C. S. REED   2,940,512
COVERING FOR SPRING STRUCTURE
Filed June 18, 1957   2 Sheets-Sheet 1
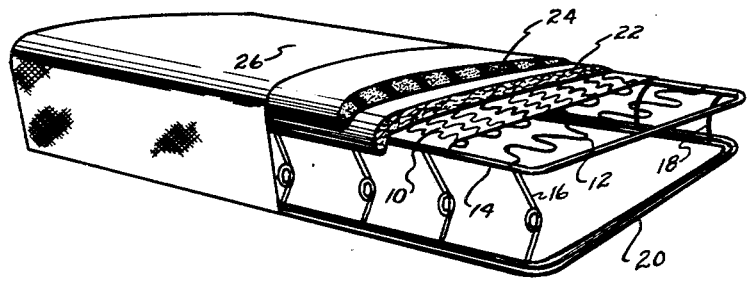
Fig 1
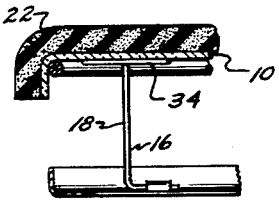
Fig 7
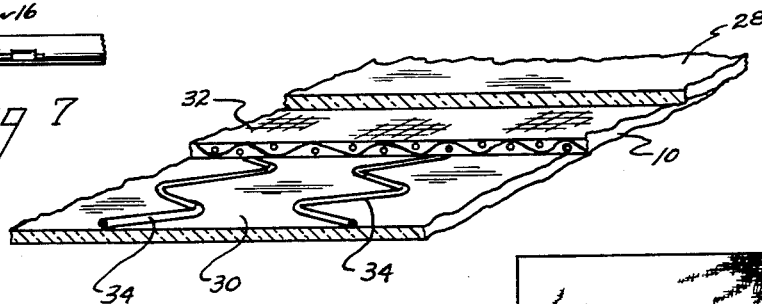
Fig 2
Fig 4
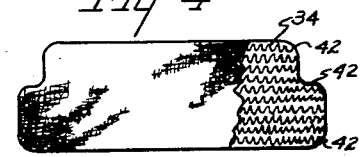
Fig 5
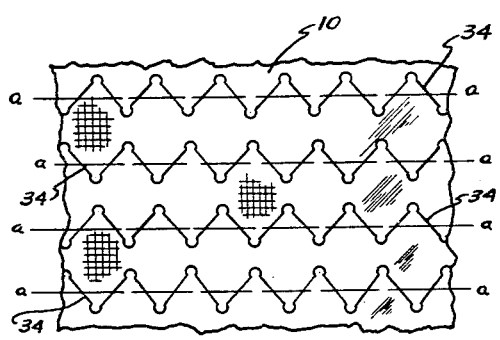
Fig 3
Fig 6
INVENTOR
CLAIR S. REED
BY *[signature]*
ATTORNEY June 14, 1960

C. S. REED 2,940,512

COVERING FOR SPRING STRUCTURE

Filed June 18, 1957

2 Sheets-Sheet 2

INVENTOR
CLAIR S. REED

BY *Townsend P. Beaman*

ATTORNEY

United States Patent Office

2,940,512
Patented June 14, 1960

2,940,512
COVERING FOR SPRING STRUCTURE

Clair S. Reed, Wayne, Mich., assignor to Van Dresser Specialties Corporation, Van Dyke, Mich.

Filed June 18, 1957, Ser. No. 666,320

8 Claims. (Cl. 155—181)

The present invention relates to reinforced upholstery supporting mats and pads. It particularly relates to mats, pads and strips used on the tops of coil, zig-zag, and other forms of resilient spring elements in the manufacture of spring seats and backs for vehicles, inner spring mattresses, upholstered furniture and the like.

As will appear from the patented art upon upholstery supporting mats and pads, a great many forms of construction have been proposed involving the use of sheet material having a reinforcing structure designed to bridge the spring elements and give support to the upholstery. In addition to the supporting function, the mat or pad must be capable of attachment to avoid displacement.

With the present trend in passenger automobiles for the lowest possible silhouette, head room and road clearance requires that the seat cushion be thin and as functional as possible. Also, competition compels that every possible economy in seat fabrication be effected.

According to the present invention, an upholstery supporting mat or pad has been provided which may be rapidly and economically fabricated yet is serviceable, readily applied to the seat or cushion structure and, of most importance has a resilient supporting function and capable of being economically applied to the entire surface of an irregularly shaped spring structure.

In carrying out the invention, one or more plastic sheet films, preferably perforated, are laminated with an open mesh fabric and transversely spaced longitudinally extending, light gauge, undulating spring wires. Preferably the spring wires are so designed and disposed in the lamination that the mat or pad may be easily and manually turned over the edge of the spring structure. This characteristic is of special importance in the case of irregularly shaped spring structure used in vehicle seats and backs as it makes it practical to apply the mat or pad to the entire spring supporting surface.

To more fully understand and appreciate the state of the art and the importance of the present invention reference may be had to the disclosure of United States Letters Patent Nos. 1,884,270; 2,008,158; 2,281,635; 2,308,849, and 2,638,154.

Thus an object of the invention is to provide an improved upholstery support for spring structure, the support being of sheet form and having undulated spring wires associated therewith.

Another object is to provide an improved upholstery supporting pad or mat in the form of a laminate of plastic film, woven fabric and undulated spring wire.

A further object is to provide a pad or mat of the type described having spring wire element so disposed as to facilitate the manual application of the pad to spring structure and particularly to irregularly shaped spring structure.

These and other objects and advantages will appear from the following description and claims.

Figure 8:
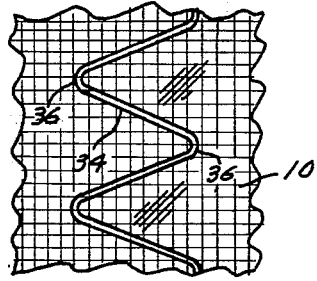
Figure 11:
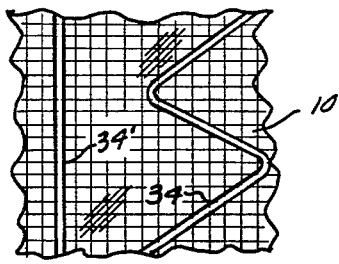
Figure 12:
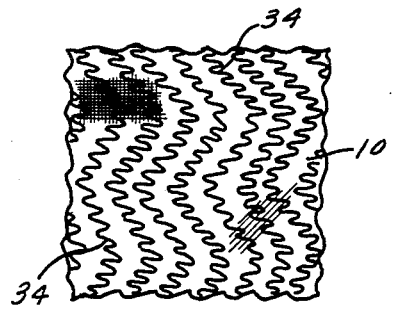
Figure 13:
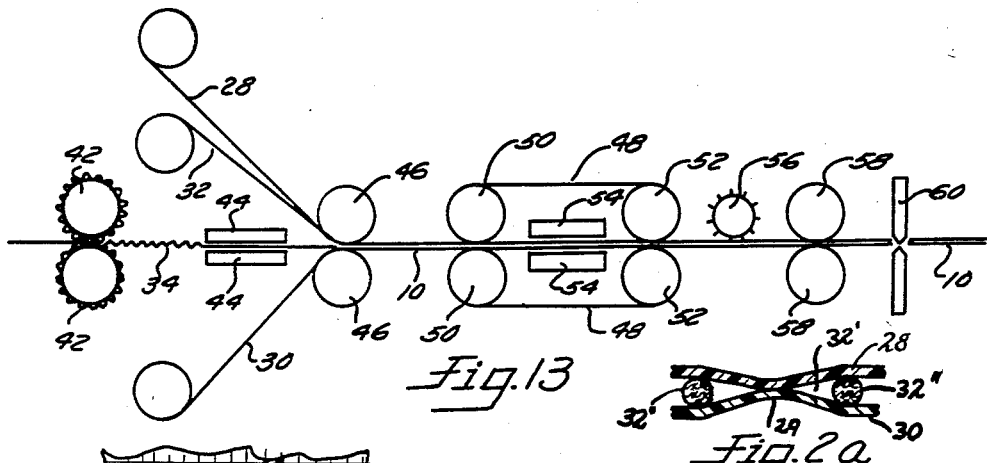
Figure 2A:
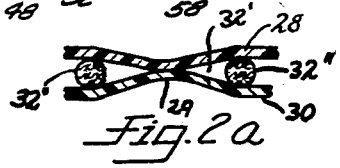

In the drawings,

Fig. 1 is a cut away perspective view of an automobile full width front seat shown with some parts shown in broken section, Fig. 2 is an enlarged broken cut away perspective view of the upholstery supporting mat or pad, Fig. 2a is an enlarged detail cross-section showing the degree of sealing between the interstices of the fabric, Fig. 3 is a broken plan view of a portion of the mat showing the wires, Fig. 4 is a plan view of a front seat of an automobile broken to show the upholstery pad, Fig. 5 is a view similar to Fig. 4 of a rear seat, Fig. 6 is a view similar to Fig. 4 of the back of a rear seat, Fig. 7 is a partial cross-sectional view showing the pad turned over the border frame of the spring structure, Figs. 8, 9, 10 and 11 are slightly enlarged, plan views of different forms of spring wire used in the laminated pad, Fig. 12 is a fragmentary plan view at greatly reduced scale of a pad having wires of the shape shown in Fig. 8 disposed undulating in the laminate, and Fig. 13 is a diagrammatic showing of apparatus for making the pad.

Referring to the illustrated forms of the invention, in Fig. 1 my improved upholstery supporting pad or mat 10 is shown disposed over the zig-zag spring elements 12 extending between the front and rear portions of the upper frame 14 which is resiliently supported by spring elements 16 and 18 from the base frame 20.

In practice, the pad 10 may be directly laid upon the surface defined by the elements 12 to give support to the usual cotton felt 22, sponge rubber layer 24 and the exterior trim material 26.

As more clearly shown in Figs. 2 and 3, the pad 10 is a flexible and resilient lamination of plastic sheets 28 and 30, fabric 32 and spaced spring wires 34 of undulating form. Sheets 28 and 30 are approximately .002" in thickness and may be made of any one of a number of tough plastic materials upon the market as, for example, copolymers of vinylidene chloride and vinyl chloride or polyethylene. The fabric 32 reinforces the plastic sheets 28 and 30 and is preferably an inexpensive, loosely woven fabric similar to mosquito netting. What is known as "tobacco cloth" having approximately 1/16" mesh and .003" diameter cotton thread has been found acceptable. The spring wires 34 are preferably of 22 to 26 gauge spaced on 1" to 1½" centers from each other and disposed in parallel arrangement as more clearly shown in Fig. 3.

The sheets 28 and 30 may be of a heat sealing plastic in which event heat sealing between the sheets 28 and 30 may take place around the wires 34 and between the interstices of the open mesh fabric 32. In lieu of heat sealing a suitable adhesive such as rubber base cement may be used to join the layers of the laminated pad 10.

To improve the resistance to tear properties of the pad 10, the pressure used in deflecting the sheets 28 and 30 toward each other to effect contact and heat sealing between the interstices 32' of the fabric 32 is preferably regulated to seal only a restricted area as at 29 to leave the threads 32" relatively free to act independently of the sheets 28 and 30. When adhesive is used to bond the sheets 28 and 30 to the fabric 32, the adhesive is preferably applied only along the lines a—a as shown in Fig. 3, the adhesive being applied in a thin line and leaving the fabric 32 free from bonding with the sheets 28 and 30 between the lines a—a. In conducting accelerated wire tests upon spring structures employing the pad 10 it has been found that the resistance to wear and tear of the pad 10 is unexpectedly improved by bonding of the fabric to the sheets 28 and 30 along spaced lines as compared with a pad 10 in which the layers are uniformly bonded throughout the entire area.

Figure 10:
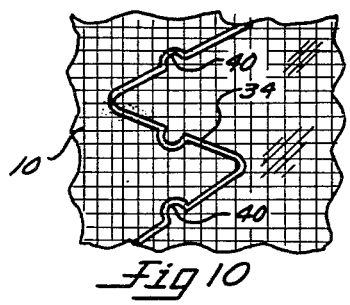

For economical fabrication the pad material should be made up in long continuous lengths from which pads 10 of desired length are cut. This cut length is then laid upon the spring elements 12 and turned over the edges of the frame 14 as shown in Fig. 7 along with the cotton felt 22 and follows the cotton felt 22 as it is conformed to the frame 14. In some spring structures the use of one or more straight wires 34', as shown in Fig. 11, may be desired in certain positions of the pad 10 to vary the feel or softness of the spring structure. Over a portion of the frame 14 disposed at right angles to the wire 34', the wire 34' may be bent without too much difficulty at the time the cotton felt 22 is being likewise conformed to the frame 14. However, where the spring structure is irregular in form, as shown in Figs. 4, 5 and 6, with the frame 14 of similar shape, the straight wires 34' will resist shaping over the edge of the frame 14 at the irregular ends. This resistance may be materially overcome by shaping the wires 34 as shown in Figs. 8, 9 and 10 to provide hinge points at the offset loop portions 36, 38 and 40. An even improved result has been obtained by using the wires 34 of the shape of Fig. 8 and disposing the wires 34 in undulation form of Fig. 12.

With my improved pad 10 using wires 34 of zig-zag shape, the pad 10 may be readily applied to the entire surface within the frame 14 to provide a support for the entire upholstery. Where the ends of the seat or back spring structure are irregular, as shown in Figs. 4, 5 and 6, the hinge points 36 and 38 and 40 enable the person trimming the seat or back of the spring structure to readily turn the pad 10 over the frame 14 along the irregular contour portions 42 along with the felt 22 as shown in Fig. 7. It will be understood that the wires 34 run lengthwise of the seat or back structure and that the pad 10 will be slightly longer than the frame 14 to enable the edges of the pad 10 to be turned over the edge of the frame 14 at the ends along with the cotton felt. At the ends of the frame 14, the wires 34 must each be bent in order to turn the edge of the pad 10 over the ends of the frame 14 and this operation is facilitated by the hinge points 36, 38 and 40 even over curved portions of the frame 14.

An apparatus for making the pad material in a continuous length is shown in Fig. 13 wherein the wires 34 are fed in spaced relation between crimping rolls 42 and rotated 90° in the shoes 44 to be led into the bite of the feed rolls 46 along with the plastic sheets 28, 30 and the fabric 32. For heat sealing, the laminated pad 10 is fed between the belts 48 running between feed rolls 50 and cooling rolls 52. The belts 48 carry the laminated pad 10 between the heating shoes 54 and press the sheets 28 and 30 into contact with each other through the interstices of the open mesh fabric 32. To permit a circulation of air through the pad 10, a perforating roller 56 is provided ahead of the puller rolls 58 and the cut off 60. Where an adhesive is used in lieu of heat sealing, the adhesive will be applied to the sheets 28 and 30 just ahead of the bite of the rolls 46.

I claim:

1. As a new article of manufacture, a pad for insulating the upholstery from the supporting spring structure disposed within the border frame thereof, said pad being unframed and consisting of a laminated sheet of readily bendable united plies, juxtaposed spring wires of flat undulant form disposed within said laminated sheet to stiffen the same and materially increase the resistance of said sheet to bending, said wires having hinge points defined as offset portions along their undulating form to provide localized hinge points in the plane of said pad to facilitate the bending of said wires about the border frame as a fulcrum in the use of the pad.

2. In combination with a spring structure having a resilient load-supporting surface defined by a border frame having side and end portions and spring wire elements in spaced, parallel relation, disposed in substantially the same plane as said border frame and connected at opposite ends to said side portions, an upholstery-supporting pad in the form of a laminated sheet having juxtaposed longitudinally extending undulating spring wires disposed in said laminated sheet and coextensive therewith, said pad being disposed upon said load-supporting surface with the longitudinal axis of wires disposed normal to the longitudinal axis of said spring wire element and extending over the entire area thereof, the area of said pad exceeding the area within said border frame to project portions of said pad across and outwardly beyond said end portions of said border frames, said wires having offset loop portions disposed along their undulated form to provide localized hinge points in the plane of said pad for facilitating the bending of said wires about said end portions of said border frames, said wires being of substantially lighter gauge and lesser spacing than said wire elements and whereby the shape of the pad is readily conformed to the shape of the border frame.

3. An upholstery-supporting pad as defined in claim 1 wherein said plies include a pair of plastic films of heat-sealing material, an open mesh fabric disposed between said films along with said wires, said fabric and films being heat-bonded along spaced longitudinally extending lines leaving the fabric relatively free of bonding with said films between said lines, the bonding between said films taking place within the interstices of said fabric.

4. A reinforced laminated flexible pad for use between upholstery material and a supporting spring structure of an upholstered unit; comprising a relatively thin assembly of four superimposed coextensive layers of flexible material, the uppermost and lowermost layers being sheets of heat sealing plastic material, the layers intermediate said uppermost and lowermost layers reinforcing said uppermost and lowermost layers and being respectively a sheet of loosely woven open mesh fabric, and a substantially flat structure of separate wires of spring metal respectively having throughout the major portions of their length sinuous portions arranged in laterally spaced substantially parallel rows within a common plane, the uppermost and lowermost layers being heat sealed together at restricted areas respectively located between the interstices of said intermediate layer of open mesh fabric and between the sinuous portions of said wires, whereby the sinuous portions of said wires and threads of said fabric are held against displacement while being free to flux relative to said uppermost and lowermost layers during flexure of said laminated pad.

5. A reinforced laminated flexible pad for use between upholstery material and a supporting spring structure of an upholstered unit; comprising a relatively thin assembly of four superimposed coextensive layers of flexible material, the uppermost and lowermost layers being sheets of flexible imperforate material, the layers intermediate said uppermost and lowermost layers reinforcing said uppermost and lowermost layers and being respectively a sheet of flexible perforated material and a substantially flat structure of separate tensile elements respectively having throughout the major portions of their length sinuous portions arranged in laterally spaced substantially parallel rows within a common plane, the uppermost and lowermost layers being bonded together through the perforations of said intermediate layer of perforated material and adjacent the sinuous portions of said tensile elements, whereby the sinuous portions of said tensile elements and portions of said perforated material between the perforations thereof are held against displacement while being free to flex relative to said uppermost and lowermost layers during flexure of said laminated pad.

6. The structure described in claim 4, wherein the sinuous portions of said wires have offset open return-bent portions arranged in substantially parallel rows and constituting hinge points for said wires.

7. A reinforced laminated flexible pad for use between upholstery material and a supporting spring structure of an upholstered unit; comprising a relatively thin assembly of three superimposed coextensive layers of flexible material, the uppermost and lowermost layers being sheets of flexible imperforate material, the layer intermediate said uppermost and lowermost layers reinforcing said uppermost and lowermost layers being a substantially flat structure of separate wires of spring metal respectively having throughout the major portions of their length sinuous portions arranged in laterally spaced substantially parallel rows within a common plane, the uppermost and lowermost layers being permanently adhered together at restricted areas respectively located adjacent the sinuous portions of said wires, whereby the sinuous portions of said wires are held against displacement while being free to flex relative to said uppermost and lowermost layers during flexure of said laminated pad.

8. The structure described in claim 7, wherein the sinuous portions of said wires have offset open return-bent portions arranged in substantially parallel rows and constituting hinge points for said wires.

References Cited in the file of this patent

UNITED STATES PATENTS

| | | |
|---|---|---|
| 1,206,073 | Young | Nov. 28, 1916 |
| 2,459,758 | Flint | Jan. 18, 1949 |
| 2,582,479 | Clark | Jan. 15, 1952 |
| 2,638,154 | De Wees | May 12, 1953 |

UNITED STATES PATENT OFFICE

CERTIFICATION OF CORRECTION

Patent No. 2,940,512                         June 14, 1960

Clair S. Reed

It is hereby certified that error appears in the above numbered patent requiring correction and that the said Letters Patent should read as corrected below.

In the grant, lines 2 and 12, and in the heading to the printed specification, lines 3 and 4, name of assignee, for "Van Dresser Specialties Corporation", each occurrence, read -- Van Dresser Specialty Corporation --.

Signed and sealed this 25th day of April 1961.

(SEAL)
Attest:

ERNEST W. SWIDER
Attesting Officer

DAVID L. LADD
Commissioner of Patents